(12) United States Patent
Tani et al.

(10) Patent No.: US 11,370,900 B2
(45) Date of Patent: Jun. 28, 2022

(54) RUBBER COMPOSITION, CROSSLINKED PRODUCT, AND TIRE

(71) Applicant: ENEOS MATERIALS CORPORATION, Tokyo (JP)

(72) Inventors: Koichiro Tani, Minato-ku (JP); Naoki Sugiyama, Minato-ku (JP); Kunpei Kobayashi, Minato-ku (JP); Ryoji Tanaka, Minato-ku (JP)

(73) Assignee: ENEOS MATERIALS CORPORATION, Tokyo (JP)

( * ) Notice: Subject to any disclaimer, the term of this patent is extended or adjusted under 35 U.S.C. 154(b) by 224 days.

(21) Appl. No.: 16/542,473

(22) Filed: Aug. 16, 2019

(65) Prior Publication Data

US 2020/0087490 A1 Mar. 19, 2020

(30) Foreign Application Priority Data

Sep. 14, 2018 (JP) .............................. JP2018-173054

(51) Int. Cl.
| | |
|---|---|
| C08L 9/06 | (2006.01) |
| C08K 3/36 | (2006.01) |
| B60C 1/00 | (2006.01) |
| C08K 3/06 | (2006.01) |
| C08K 3/22 | (2006.01) |
| C08L 91/00 | (2006.01) |
| C08K 5/00 | (2006.01) |
| C08K 5/09 | (2006.01) |

(52) U.S. Cl.
CPC .............. *C08L 9/06* (2013.01); *B60C 1/0016* (2013.01); *B60C 1/0025* (2013.01); *C08K 3/36* (2013.01); *C08K 3/06* (2013.01); *C08K 3/22* (2013.01); *C08K 5/0025* (2013.01); *C08K 5/09* (2013.01); *C08K 2003/2296* (2013.01); *C08L 91/00* (2013.01)

(58) Field of Classification Search
None
See application file for complete search history.

(56) References Cited

U.S. PATENT DOCUMENTS

| | | | | |
|---|---|---|---|---|
| 6,255,416 | B1 * | 7/2001 | Sone ....................... | C08F 4/545 526/114 |
| 6,838,526 | B1 * | 1/2005 | Sone ..................... | B60C 1/0016 525/332.8 |
| 7,335,692 | B2 * | 2/2008 | Vasseur ................. | B60C 1/0016 524/312 |
| 2005/0009979 | A1 * | 1/2005 | Tanaka ..................... | C08C 19/34 524/492 |
| 2005/0154148 | A1 * | 7/2005 | Nakamichi ............. | C08L 67/04 525/450 |
| 2007/0084369 | A1 | 4/2007 | Kodama et al. | |
| 2007/0155890 | A1 * | 7/2007 | Chen ....................... | C08K 3/013 524/493 |
| 2008/0188613 | A1 * | 8/2008 | Tanaka ..................... | C08C 19/25 524/566 |
| 2009/0292043 | A1 * | 11/2009 | Kurazumi ................. | B60C 1/00 523/152 |
| 2009/0306269 | A1 * | 12/2009 | Ota ........................... | C08L 7/00 524/437 |
| 2009/0308513 | A1 * | 12/2009 | Ota ........................... | C08K 3/34 152/209.5 |
| 2010/0105827 | A1 * | 4/2010 | Tanaka ..................... | C08L 15/00 524/566 |
| 2010/0218868 | A1 * | 9/2010 | Tonosaki ................. | C08K 3/04 152/209.18 |
| 2010/0222502 | A1 * | 9/2010 | Tanaka ..................... | C08C 19/44 524/588 |
| 2011/0146877 | A1 * | 6/2011 | Tanaka ..................... | C08L 15/00 152/547 |
| 2011/0184114 | A1 * | 7/2011 | Matsushita ............... | C08L 7/00 524/495 |
| 2011/0196086 | A1 * | 8/2011 | Matsushita ............... | C08C 1/04 524/498 |
| 2011/0319519 | A1 * | 12/2011 | Sone ......................... | C08L 15/00 523/155 |
| 2013/0267640 | A1 * | 10/2013 | Lopez .................... | F24S 25/634 524/322 |
| 2017/0174001 | A1 * | 6/2017 | Miyazaki ................. | C08K 3/22 |
| 2018/0022904 | A1 | 1/2018 | Weber et al. | |
| 2020/0055336 | A1 * | 2/2020 | Sakurada ............... | B60C 1/0016 |
| 2020/0087490 | A1 * | 3/2020 | Tani ......................... | C08K 3/36 |

FOREIGN PATENT DOCUMENTS

| | | | | |
|---|---|---|---|---|
| EP | 2165855 A1 | * | 3/2010 | ........... B60C 1/0016 |
| JP | 2006-206872 A | | 8/2006 | |
| JP | 2006-249069 A | | 9/2006 | |
| JP | 2011-140628 A | | 7/2011 | |
| JP | 2018-048305 A | | 3/2018 | |

OTHER PUBLICATIONS

Thermal Properties and Three-Phase Structure of cis-1,4-polybutadiene, to DiLorenzo, Maria Laura, The Open Macromolecules Journal, 2010, 4, 15-21 (Year: 2010).*
Bulk Properties of syndiotactic 1,2 polybutadiene, Obata et al., Polymer Journal, vol. 7, No. 2, pp. 207-216 (1975). (Year: 1976).*
Modification and thermal properties of syndiotactic 1,2 polybutadiene, Naga et al, Polym. Bull. (2019), 76: 241-257. (Year: 2019).*
Extended European Search Report dated Feb. 7, 2020 in European Patent Application No. 19190179.2, 6 pages.
Notice of Reasons for Refusal dated Dec. 7, 2021, in Japanese Patent Application No. 2018-173504 filed Sep. 14, 2018 (with English machine translation).

* cited by examiner

*Primary Examiner* — Peter A Salamon
(74) *Attorney, Agent, or Firm* — Oblon, McClelland, Maier & Neustadt, L.L.P.

(57) ABSTRACT

A rubber composition contains (A) a modified conjugated diene-based polymer, (B) modified silica, and (C) a polymer having crystalline character. A crosslinked product is produced through crosslinking of the rubber composition containing the modified conjugated diene-based polymer (A), the modified silica (B), and the polymer having crystalline character (C). The crosslinked product is used for producing a tire including a tread and a sidewall, wherein at least one of the tread and the sidewall is formed of the crosslinked product.

20 Claims, No Drawings

RUBBER COMPOSITION, CROSSLINKED PRODUCT, AND TIRE

CROSS-REFERENCE TO RELATED APPLICATIONS

The present application claims priority under 35 U.S.C. § 119 to Japanese Patent Application No. 2018-173054, filed Sep. 14, 2018. The contents of this application are incorporated herein by reference in their entirety.

BACKGROUND OF THE INVENTION

Field of the Invention

The present disclosure relates to a rubber composition, a crosslinked product, and a tire.

Discussion of the Background

Conjugated diene-based polymers (e.g., styrene-butadiene copolymer) produced through polymerization of a conjugated diene compound exhibit good properties (e.g., thermal resistance, wear resistance, mechanical strength, and processability). Thus, the conjugated diene-based polymers have been widely used in various industrial products, including pneumatic tires, vibration-proof rubber bodies, and hoses. In particular, a conjugated diene-based polymer (e.g., S-SBR) produced through solution polymerization has a relatively narrow molecular weight distribution and is suitable as a material for producing a fuel-efficient tire. There has been proposed a rubber composition used for producing tires, wherein the composition contains silica as a reinforcing agent for achieving low hysteresis loss and excellent fuel efficiency.

Silica particles have silanol groups on their surfaces, and thus are disadvantageous in that they are likely to aggregate in a rubber composition and exhibit poor dispersibility therein. In order to improve the dispersibility of silica and to produce a tire exhibiting excellent fuel efficiency, the terminal or main chain of a conjugated diene-based polymer has been modified with a functional group that interacts with silica. There has been proposed a rubber composition containing modified silica prepared through surface treatment of silica with a silane coupling agent for further improving silica dispersibility (see, for example, Japanese Patent Application Laid-Open (kokai) No. 2011-140628). Japanese Patent Application Laid-Open (kokai) No. 2011-140628 discloses a rubber composition for a tire containing a rubber component including modified diene-based rubber and a silica component including modified silica. According to Japanese Patent Application Laid-Open (kokai) No. 2011-140628, the rubber composition can achieve well-balanced improvement in fuel efficiency, wet grip property, and wear resistance.

SUMMARY OF THE INVENTION

According to one aspect of the present disclosure, a rubber composition includes (A) a modified conjugated diene-based polymer; (B) modified silica; and (C) a polymer having crystalline character.

According to another aspect of the present disclosure, a crosslinked product is obtained through crosslinking of the rubber composition.

According to another aspect of the present disclosure, a tire includes a tread and a sidewall, wherein at least one of the tread and the sidewall is formed of the crosslinked product.

DESCRIPTION OF THE EMBODIMENTS

The present inventors have found that when a crosslinked product is produced from the rubber composition disclosed in Japanese Patent Application Laid-Open (kokai) No. 2011-140628 (i.e., a rubber composition containing modified conjugated diene-based rubber and modified silica), the crosslinked product exhibits insufficient hardness and thus has room for further improvement. The crosslinked product is demanded to have both high hardness and sufficiently high wear resistance. When the crosslinked product is used for tire applications, the crosslinked product is required to have excellent low hysteresis loss property and wet grip property; i.e., well-balanced improvement in these properties.

In view of the foregoing, an object of the present disclosure is to provide a rubber composition capable of producing a crosslinked product having sufficiently high hardness and exhibiting well-balanced improvement in wear resistance, low hysteresis loss property, and wet grip property.

According to the present disclosure, there can be produced a crosslinked product having sufficiently high hardness and exhibiting well-balanced improvement in wear resistance, low hysteresis loss property, and wet grip property.

<<Rubber Composition>>

The rubber composition of the present disclosure will next be described. As used herein, the term "to" between two numerical values indicates that the numeric values before and after the term are inclusive as the lower limit value and the upper limit value, respectively. The rubber composition of the present disclosure contains the following components (A), (B) and (C).

(A) a modified conjugated diene-based polymer;
(B) modified silica; and
(C) a polymer having crystalline character (hereinafter the polymer may be referred to as a "crystalline polymer").

The modified conjugated diene-based polymer has a structural unit derived from a conjugated diene compound. Examples of the conjugated diene compound include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, and 2-chloro-1,3-butadiene. Of these, at least one of 1,3-butadiene, isoprene, and 2,3-dimethyl-1,3-butadiene is preferred. Particularly preferred is 1,3-butadiene, since such a 1,3-butadiene achieves well-balanced improvements in processability and low hysteresis loss property. These structural units derived from the conjugated diene compounds in the conjugated diene-based polymer may be singly or in combination of two or more species.

The conjugated diene-based polymer may be a homopolymer of the conjugated diene compound (e.g., modified butadiene rubber, or modified isoprene rubber), but is preferably a copolymer of a conjugated diene compound and an aromatic vinyl compound, since such a copolymer enables the resultant rubber to have high strength. Examples of the aromatic vinyl compound include styrene, methylstyrene, ethylstyrene, t-butoxystyrene, vinylethylbenzene, divinylbenzene, vinylbenzyldimethylamine, (4-vinylbenzyl) dimethylaminoethyl ether, N,N-dimethylaminoethylstyrene, N,N-dimethylaminomethylstyrene, vinylpyridine, diphenylethylene, and a tertiary amino group-containing diphenylethylene (e.g., 1-(4-N,N-dimethylaminophenyl)-1-phenyl-ethylene). Among these, at least one of styrene and α-methylstyrene is preferable.

When the conjugated diene-based polymer is a copolymer having a structural unit derived from the conjugated diene compound and a structural unit derived from the aromatic vinyl compound, the amount of the structural unit derived from the aromatic vinyl compound in the polymer is preferably 3 to 55 mass %, more preferably 5 to 50 mass %, relative to the total amount of the conjugated diene compound and aromatic vinyl compound used for the polymerization, since such an amount enables the resultant cross-linked product to have a better balance between low hysteresis loss property and wet skid resistance. The amount of the structural unit derived from the aromatic vinyl compound in the polymer is measured by means of $^1$H-NMR.

When the modified conjugated diene-based polymer is the copolymer of the conjugated diene compound and the aromatic vinyl compound, the modified conjugated diene-based polymer is preferably a random copolymer of the conjugated diene compound and the aromatic vinyl compound. The random copolymer may contain a block moiety formed of the conjugated diene compound or the aromatic vinyl compound. The modified conjugated diene-based polymer is particularly preferably a styrene-butadiene copolymer (SBR).

The conjugated diene-based polymer may have a structural unit derived from a compound other than the conjugated diene compound and the aromatic vinyl compound (hereinafter may referred to as "an additional compound"), so long as the advantageous effects of the present disclosure are not impaired. Examples of the additional compound include acrylonitrile, methyl (meth)acrylate, and ethyl (meth)acrylate. The amount of the structural unit derived from the additional compound in the modified conjugated diene-based polymer is preferably 10 mass % or less, more preferably 5 mass % or less, relative to the total amount of the structural units in the modified conjugated diene-based polymer.

The modified conjugated diene-based polymer has a functional group that interacts with silica on at least one of the main chain and terminal of the polymer. As used herein, the term "functional group that interacts with silica" refers to a group having an element that interacts with silica, such as nitrogen, sulfur, phosphorus, oxygen, or silicon. The silicon contained in the "functional group that interacts with silica" is the silicon contained in a hydrocarbyloxysilyl group. The functional group that interacts with silica of the modified conjugated diene-based polymer is preferably at least one group selected from the group consisting of an amino group, an imino group, a pyridyl group, a phosphino group, a thiol group, and a hydrocarbyloxysilyl group, since such a functional group can more effectively improve low hysteresis loss property. The nitrogen, phosphorous, or sulfur contained in the functional group that interacts with silica may be protected with a protective group (e.g., a trisubstituted hydrocarbylsilyl group).

No particular limitation is imposed on the method for producing the modified conjugated diene-based polymer, and the polymer can be produced by any conventionally known method. Specific examples of the method include a method involving reaction between an active terminal of a conjugated diene-based polymer and a compound having a functional group that interacts with silica (hereinafter the compound may be referred to as a "modifier"); a method involving reaction between a modifier and an active moiety formed on the main chain or side chain of a conjugated diene-based polymer; a method involving polymerization of a monomer with a modifier serving as a polymerization initiator; and a method involving polymerization of a monomer having a functional group that interacts with silica.

The modifier for modifying at least one of the polymerization end terminal and the main chain is a compound having at least one atom selected from the group consisting of nitrogen, sulfur, phosphorus, oxygen, and silicon. Specific examples of preferred modifiers include compounds represented by the following formulae (1) and (2):

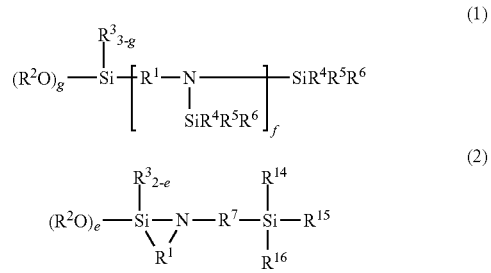

wherein $R^1$ represents a C1 to C12 hydrocarbylene group; $R^2$ and $R^3$ each independently represent a C1 to C20 hydrocarbyl group; $R^4$ represents a C1 to C20 hydrocarbyl group; $R^5$ and $R^6$ each independently represent a C1 to C20 hydrocarbyl group, or $R^5$ and $R^6$ taken together represent a ring together with the silicon atom to which $R^5$ and $R^6$ bond; $R^7$ represents a single bond or a C1 to C12 hydrocarbylene group; $R^{14}$, $R^{15}$, and $R^{16}$ each independently represent a C1 to C20 hydrocarbyl or hydrocarbyloxy group, and when $R^7$ is a hydrocarbylene group, at least two of $R^{14}$ to $R^{16}$ are a hydrocarbyloxy group; g is an integer of 1 to 3; f is an integer of 1 to 10; e is 1 or 2; and when each of $R^1$ to $R^6$ corresponds to a plurality of groups, the groups may be identical to or different from one another.

Examples of the hydrocarbyl group represented by $R^2$ to $R^6$, $R^{14}$ to $R^{16}$, and $R^9$ in the formulae (1) and (2) include a C1 to C20 alkyl group, an allyl group, a C3 to C20 cycloalkyl group, and a C6 to C20 aryl group. Examples of the hydrocarbyloxy group represented by $R^{14}$ to $R^{16}$ include a C1 to C20 alkyloxy group, an allyloxy group, a C3 to C20 cycloalkyloxy group, and a C6 to C20 aryloxy group. Examples of the hydrocarbylene group represented by $R^1$ and $R^7$ include a C1 to C12 alkanediyl group, a C3 to C12 cycloalkylene group, and a C6 to C12 arylene group. In the formulae (1) and (2), each of g and e is preferably 2 or 3, more preferably 3, from the viewpoint of further improvement in silica dispersibility. In the formula (1), f is preferably 1 to 3.

Specific examples of the modifier for modifying at least one of the polymerization end terminal and the main chain include N,N-bis(trimethylsilyl)aminopropylmethyldimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-dimethylaminopropylmethyldiethoxysilane, 2-methyl-1-(3-(trimethoxysilyl)propyl)-4,5-dihydro-1H-imidazole, N-(1,3-dimethylbutylidene)-3-(triethoxysilyl)-1-propaneamine, P,P-bis(trimethylsilyl)phosphinopropylmethyldimethoxysilane, S-trimethylsilylmercaptopropylmethyldimethoxysilane, 2,2-dimethoxy-1-(3-trimethoxysilylpropyl)-1,2-azasilolidine, 2,2-dimethoxy-1-(3-trimethoxysilylpropyl)-1-aza-2-silacyclopentane, 2,2-dimethoxy-1-phenyl-1,2-azasilolidine, 1-trimethylsilyl-2,2-dimethoxy-1-aza-2- silacyclopentane, 2,2-dimethoxy-8-(4-methylpiperazinyl)methyl-1,6-dioxa-2-silacyclooctane, and compounds prepared through substitution of an alkyl group or an alkanediyl group in any of the aforementioned compounds by a C1 to C6 alkyl group or a C1 to C6 alkanediyl group, respectively.

The modifier for modifying the polymerization initiation terminal is, for example, a mixture of an alkali metal compound or an alkaline earth metal compound and a secondary amine compound. Specific examples of the secondary amine compound include dimethylamine, piperidine, pyrrolidine, hexamethyleneimine, N-(trimethylsilyl)piperazine, N-(tert-butyldimethylsilyl)piperazine, N,N'-dimethyl-N'-trimethylsilyl-1,6-diaminohexane, and 1,3-ditrimethylsilyl-1,3,5-triazinane.

Of the aforementioned modified conjugated diene-based polymers, preferred is a terminal-modified conjugated diene-based polymer prepared by modification of at least one terminal of a conjugated diene-based polymer with a modifier, since such a terminal-modified conjugated diene-based polymer exhibits a higher effect of improving the dispersibility of modified silica. Of the aforementioned modified conjugated diene-based polymers, particularly preferred is a modified conjugated diene-based polymer having a terminal modified with a modifier having a nitrogen-containing group and a hydrocarbyloxysilyl group. Particularly preferred is a modified conjugated diene-based polymer having a terminal modified with at least one compound selected from the group consisting of a compound represented by the aforementioned formula (1) and a compound represented by the aforementioned formula (2). The aforementioned modified conjugated diene-based polymers may be used singly or in combination of two or more species.

The modified conjugated diene-based polymer has a weight average molecular weight (Mw) (in terms of polystyrene) of preferably $1.0 \times 10^4$ to $2.0 \times 10^6$ as determined by means of gel permeation chromatography (GPC). The Mw of less than $1.0 \times 10^4$ tends to lead to a reduction in the tensile strength, fuel efficiency, and wear resistance of the resultant crosslinked product, whereas the Mw exceeding $2.0 \times 10^6$ tends to lead to impairment of the processability of the resultant rubber composition. The Mw is more preferably $1.2 \times 10^4$ to $1.5 \times 10^6$, still more preferably $1.5 \times 10^4$ to $1.0 \times 10^6$.

The 1,2-vinyl bond content of the modified conjugated diene-based polymer is preferably 20 mass % or more, more preferably 23 mass % or more, still more preferably 25 mass % or more. The 1,2-vinyl bond content is preferably 70 mass % or less, more preferably 68 mass % or less, still more preferably 65 mass % or less, since such a 1,2-vinyl bond content enables the resultant crosslinked product to secure sufficient wear resistance. As used herein, the term "1,2-vinyl bond content" refers to the percentage of structural units having a 1,2-bond relative to all butadiene structural units in the modified conjugated diene-based polymer. The 1,2-vinyl bond content is measured by means of $^1$H-NMR.

The amount of the modified conjugated diene-based polymer contained in the rubber composition is preferably 20 mass % or more, more preferably 30 mass % or more, still more preferably 40 mass % or more, relative to the entirety of the polymer components contained in the rubber composition, in order to sufficiently increase the hardness of the resultant crosslinked product and to improve the wear resistance, low hysteresis loss property, and wet grip property of the crosslinked product. The amount of the modified conjugated diene-based polymer is preferably 95 mass % or less, more preferably 90 mass % or less, still more preferably 80 mass % or less.

<Modified Silica (B)>

Modified silica has, on its surface, a functional group (besides a hydroxyl group) bonded to a silicon atom. Preferably, modified silica is prepared by surface treatment of hydrophilic silica with a treatment agent, such as a silane coupling agent or a hydrophobicizing agent. Examples of the silica (unmodified silica) used for preparation of modified silica include wet silica (hydrated silica), dry silica (silicic anhydride), colloidal silica, precipitated silica, calcium silicate, and aluminum silicate. Wet silica is preferably used, since it effectively achieves an improvement in fracture property and the compatibility between wet grip property and low rolling resistance. No particular limitation is imposed on the nitrogen adsorption specific surface area ($N_2SA$) of silica, and the nitrogen adsorption specific surface area is preferably 100 to 300 $m^2/g$. The nitrogen adsorption specific surface area of silica is measured according to ISO 5794/1.

No particular limitation is imposed on the silane coupling agent used for surface treatment of silica, and the silane coupling agent can be selected from a variety of conventionally known silane coupling agents incorporated into a rubber composition for improving the dispersibility of silica in a rubber component. Specific examples of the usable silane coupling agent include sulfur-containing organic silane compounds, such as bis(3-triethoxysilylpropyl) polysulfide, 3-trimethoxysilylpropylbenzothiazyl tetrasulfide, bis(3-triethoxysilylpropyl) tetrasulfide, bis(3-triethoxysilylpropyl) disulfide, bis(2-triethoxysilylpropyl) tetrasulfide, 3-mercaptopropyltrimethoxysilane, 3-mercaptopropylmethyldimethoxysilane, and mercaptosilane exemplified in Japanese Patent Application Laid-Open (kokai) No. 2006-249069; and nitrogen-containing organic silane compounds, such as 2-aminoethyltriethoxysilane, 2-aminoethylmethyldiethoxysilane, 3-aminopropyltriethoxysilane, and 3-(2-aminoethyl)aminopropylmethyltrimethoxysilane.

Examples of the hydrophobicizing agent include saturated and unsaturated fatty acids, such as hexanoic acid, decanoic acid, dodecanoic acid, palmitic acid, stearic acid, isostearic acid, and oleic acid; halogenated silane compounds, such as dimethyldichlorosilane, diethyldichlorosilane, methylphenyldichlorosilane, allylmethyldichlorosilane, vinylmethyldichlorosilane, and hexenylmethyldichlorosilane; and hydrocarbyl-group-containing silane compounds, such as methyltrimethoxysilane, dimethyldimethoxysilane, ethyltrimethoxysilane, n-octyltriethoxysilane, and vinylmethyldimethoxysilane.

In the case of preparation of modified silica, the aforementioned treatment agents may be used singly or in combination of two or more species. For example, modified silica is prepared by any of the following methods: (1) a method involving modification of unmodified silica with any of the aforementioned sulfur-containing organic silane compounds and a fatty acid; (2) a method involving surface treatment of unmodified silica with any of the aforementioned sulfur-containing organic silane compounds and nitrogen-containing organic silane compounds, and reaction of the resultant product with a fatty acid; and (3) a method involving modification of unmodified silica with any of the aforementioned sulfur-containing organic silane compounds and hydrocarbyl-group-containing silane compounds. No particular limitation is imposed on the method for surface treatment of unmodified silica, and the surface treatment can be performed through any conventionally known method. For example, the surface treatment is performed through a method involving addition of unmodified silica to a mixer, subsequent addition of a treatment agent to the mixer, and stirring of the resultant mixture. The surface treatment conditions (e.g., temperature and the amount of a treatment agent relative to silica) can be appropriately determined depending on, for example, the types of silica and the treatment agent.

Modified silica has, on its surface, a functional group besides a hydroxyl group. The functional group is preferably at least one species selected from the group consisting of an amino group, an amido group, a carboxy group, a hydrocarbyloxycarbonyl group, a mercapto group, and a (poly)sulfide group, since such a functional group more effectively improves the dispersibility of silica in a rubber component. The term "(poly)sulfide group" includes both a "sulfide group" and a "polysulfide group." The hydrocarbyl group contained in the hydrocarbyloxycarbonyl group is preferably a C1 to C12 linear or branched alkyl group, a C2 to C12 linear or branched alkenyl group, a C3 to C12 cycloalkyl group, or a C6 to C12 aryl group. No particular limitation is imposed on the method for bonding the aforementioned functional group to the silica surface. For example, the method may involve varying the types and combinations of treatment agents used for preparation of modified silica.

The amount of modified silica contained in the rubber composition is preferably 20 parts by mass or more, more preferably 25 parts by mass or more, relative to 100 parts by mass of the polymer components contained in the rubber composition, in order to secure the wear resistance of the resultant crosslinked product and to improve the sufficient low hysteresis loss property and wet grip property of the crosslinked product. The amount of modified silica is preferably 130 parts by mass or less, more preferably 110 parts by mass or less, relative to 100 parts by mass of the polymer components contained in the rubber composition, in order to prevent impairment of the wear resistance of the resultant crosslinked product. A single type of modified silica may be used, or two or more types of modified silica may be used in combination.

<(C) Crystalline Polymer>

The crystalline polymer has a melting point, since at least a portion of the polymer is in a crystalline state. As used herein, the expression "a polymer has crystalline character" refers to the case where a portion or the entirety of the polymer is crystallized when the polymer is in a non-extended state at ambient temperature. The modified conjugated diene-based polymer (i.e., component (A)) is a polymer having no crystalline character; i.e., a polymer having no melting point.

No particular limitation is imposed on the crystalline polymer, so long as it has crystalline character. The crystalline polymer is preferably a crystalline olefin polymer. Incorporation of a crystalline olefin polymer into the rubber composition together with the aforementioned components (A) and (B) is preferred, since this formulation enables the resultant crosslinked product to secure sufficient wear resistance, low hysteresis loss property, and wet grip property and to have sufficiently high hardness.

The crystalline olefin polymer preferably has a structural unit derived from a C2 to C8 olefin. Specific examples of the crystalline olefin polymer include isotactic and syndiotactic forms of olefin polymers, such as polyethylene (e.g., low-density polyethylene (LDPE) or high-density polyethylene (HDPE)), polypropylene, polystyrene, 1,2-polybutadiene (e.g., thermoplastic elastomer having a 1,2-bond in an amount of 80% or more, preferably 90% or more), 1,2-polybutene, an ethylene-propylene copolymer, an ethylene-1-butene copolymer, and an ethylene-propylene-1-butene copolymer. Of these, the crystalline olefin polymer is preferably at least one species selected from the group consisting of 1,2-polybutadiene, polystyrene, polypropylene, polyethylene, and an ethylene-propylene copolymer, particularly preferably at least one of 1,2-polybutadiene, polyethylene, and an ethylene-propylene copolymer, since such a preferred polymer enables the resultant crosslinked product to have better wear resistance, low hysteresis loss property, and wet grip property. The crystalline polymer is preferably a syndiotactic polymer, since a syndiotactic polymer enables the resultant crosslinked product to have good wear resistance, low hysteresis loss property, and wet grip property and to have further increased hardness. The syndiotactic polymer is particularly preferably syndiotactic 1,2-polybutadiene, in view of production of a crosslinked product having excellent wet grip property.

In the crystalline polymer, the percentage of a crystalline moiety relative to the total of the crystalline moiety and an amorphous moiety (i.e., crystallinity) is preferably 5% or more, more preferably 10% or more, still more preferably 12% or more, in order to sufficiently improve the hardness of the crosslinked product by incorporation of the crystalline polymer. The crystallinity is preferably 70% or less, more preferably 65% or less, still more preferably 50% or less, in order to prevent impairment of the processability of the rubber composition. As used herein, the "crystallinity" is determined by means of X-ray diffractometry. Specifically, peak areas derived from a crystalline moiety and an amorphous moiety are determined from an X-ray diffraction profile obtained by means of wide angle X-ray diffractometry, and the crystallinity is calculated by the following formula (1):

the crystallinity (%)=(the peak area derived from the crystalline moiety)/(the peak area derived from the crystalline moiety+the peak area derived from the amorphous moiety)×100    (1).

Since the crystallinity correlates with density, the crystallinity can be calculated on the basis of known densities corresponding to specific degrees of crystallization determined by means of X-ray diffractometry. For example, the crystallinity of 1,2-polybutadiene can be calculated through conversion of the density of 1,2-polybutadiene at a crystallinity of 0% (i.e., 0.889 g/cm$^3$) and the density of 1,2-polybutadiene at a crystallinity of 100% (i.e., 0.963 g/cm$^3$), wherein the densities are measured through the water displacement method. Also, the crystallinity of polyethylene can be calculated through conversion of the density of polyethylene at a crystallinity of 0% (i.e., 0.850 g/cm$^3$) and the density of polyethylene at a crystallinity of 100% (i.e., 1.014 g/cm$^3$), wherein the densities are measured by the water displacement method.

The melting point (Tm) of the crystalline polymer is preferably 50° C. or higher, more preferably 60° C. or higher, still more preferably 65° C. or higher, since such a melting point enables production of a crosslinked product having higher hardness and wear resistance. The melting point is preferably 140° C. or lower, more preferably 135° C. or lower, since such a melting point achieves sufficient low hysteresis loss property and wet grip property of the resultant crosslinked product. The melting point of the crystalline polymer corresponds to a temperature at which the amount of heat absorbed by crystal melting peaks in a melting curve obtained by means of a differential scanning calorimeter (DSC).

The weight average molecular weight (Mw) of the crystalline polymer (in terms of polystyrene) determined by GPC is preferably $3.0 \times 10^4$ to $1.0 \times 10^6$, more preferably $5.0 \times 10^4$ to $8.0 \times 10^5$, still more preferably $7.0 \times 10^4$ to $5.0 \times 10^5$, since such a value achieves a good balance between the hardness of the resultant crosslinked product and the processability of the rubber composition.

The amount of the crystalline polymer is preferably 1 to 15 mass % relative to the entire amount of the rubber composition. An amount of the crystalline polymer of 1 mass % or more is preferred in view of achieving sufficiently high improvement in the hardness of a crosslinked product and production of a crosslinked product having higher wet grip property. An amount of the crystalline polymer of 15 mass % or less is preferred in view of production of a crosslinked product having excellent wear resistance and low hysteresis loss property. The amount of the crystalline polymer is more preferably 2 to 12 mass %, still more preferably 3 to 10 mass %, relative to the entire amount of the rubber composition.

The amount of the crystalline polymer is preferably 2 mass % or more, more preferably 3 mass % or more, still more preferably 5 mass % or more, relative to the total amount of the polymer components contained in the rubber composition. The amount of the crystalline polymer is preferably 30 mass % or less, more preferably 25 mass % or less, relative to the total amount of the polymer components contained in the rubber composition. A single crystalline polymer may be used, or two or more crystalline polymers may be used in combination.

<Additional Component>

The rubber composition of the present disclosure may contain a component different from the aforementioned components (A), (B) and (C) (an additional component), so long as the effects of the present disclosure are not impaired. The additional component will next be described.

The rubber composition of the present disclosure may contain, besides modified silica (i.e., component (B)), an additional inorganic filler different from modified silica. Examples of the additional inorganic filler include unmodified silica and carbon black. The unmodified silica is, for example, any of the aforementioned types of silica, and is preferably wet silica.

Examples of the carbon black include, but are not particularly limited to, GPF, FEF, HAF, ISAF, and SAF. The rubber composition may contain any reinforcing inorganic filler (e.g., clay or calcium carbonate) besides silica or carbon black. In the case where such an additional inorganic filler is used, the amount of the inorganic filler (the total amount of the modified silica and the additional inorganic filler) contained in the rubber composition is preferably 25 to 130 parts by mass, more preferably 30 to 110 parts by mass, relative to 100 parts by mass of the total amount of the polymer components contained in the rubber composition. In the case where the additional inorganic filler is used, the ratio of the modified silica to the inorganic filler in the rubber composition is preferably 50 mass % or more, more preferably 70 mass % or more.

The rubber composition generally contains a crosslinking agent. Examples of the crosslinking agent include sulfur, sulfur halides, organic peroxides, quinone dioximes, organic polyamine compounds, and alkyl phenolic resins having a methylol group. Sulfur is generally used. The amount of sulfur is preferably 0.1 to 5 parts by mass, more preferably 0.5 to 3 parts by mass, relative to 100 parts by mass of the total amount of the rubber components contained in the rubber composition.

The rubber composition may contain, besides the modified conjugated diene-based polymer and the crystalline polymer, an additional rubber component different from the modified conjugated diene-based polymer and the crystalline polymer. Examples of the type of the additional rubber component include, but are not particularly limited to, butadiene rubber (BR, such as high cis BR having a cis-1,4 bond content of 90% or more), styrene butadiene rubber (SBR), natural rubber (NR), isoprene rubber (IR), styrene-isoprene copolymer rubber, and butadiene-isoprene copolymer rubber. The amount of the additional rubber component is preferably 5 to 60 parts by mass, more preferably 10 to 50 parts by mass, relative to 100 parts by mass of the total amount of the rubber components (the modified conjugated diene-based polymer, the crystalline polymer, and the additional rubber component) contained in the rubber composition.

The rubber composition may contain, in addition to the aforementioned components, any additive that is commonly used in a rubber composition for tire. Examples of the additive include an antioxidant, zinc oxide, stearic acid, a softener, a vulcanization accelerator, a silane coupling agent, a compatibilizer, a vulcanization aid, a process oil, a processing aid, and an anti-scorching agent. The amount of such an additive incorporated into the rubber composition may be appropriately determined, so long as the advantageous effects of the present disclosure are not impaired.

<<Crosslinked Product and Tire>>

The rubber composition of the present disclosure can be prepared through mixing of the polymer components, the crosslinking agent, and an optional component by means of, for example, an open-type kneader (e.g., a roll) or a closed-type kneader (e.g., a Banbury mixer). The polymer composition is prepared into a crosslinked product through molding and subsequent crosslinking (vulcanization). The resultant crosslinked polymer can be applied to various rubber products. For example, the crosslinked polymer can be applied to tires (e.g., tire tread, undertread, carcass, sidewall, and bead); sealing materials, such as packing, gasket, weather strip, and O-ring; interior and exterior surface materials for various vehicles, such as automobile, ship, aircraft, and train; building materials; vibration-proof rubbers for industrial machines and facilities; hoses and hose covers, such as diaphragm, roll, radiator hose, and air hose; belts, such as belts for power transmission; linings; dust boots; materials for medical devices; fenders; insulating materials for electric wires; and other industrial products.

The rubber composition of the present disclosure can provide a crosslinked product that achieves sufficiently high hardness and excellent wear resistance. Furthermore, in particular, the rubber composition of the present disclosure can provide a crosslinked product exhibiting high hardness and excellent wear resistance and excellent low fuel consumption performance and wet grip property. Thus, the rubber composition of the present disclosure is particularly suitable for use as a material of a tire tread, sidewall, or both.

The tire can be produced by a customary method. For example, the rubber composition of the present disclosure is mixed by means of a kneader to form a sheet, and the sheet is disposed at a predetermined position and vulcanized by a customary method, to thereby form a tread rubber or a sidewall rubber. A pneumatic tire is thereby produced.

EXAMPLES

The following will specifically describe the present invention based on examples, but the contents of the present invention are not limited to these examples. Unless otherwise specified, the units "part(s)" and "%" described in Examples and Comparative Examples refer to "part(s) by mass" and "mass %," respectively.

The crystallinity of a polymer was calculated as follows.
[Crystallinity of 1,2-polybutadiene]: The crystallinity of 1,2-polybutadiene was calculated from densities which were measured by the water displacement method. The density of 1,2-polybutadiene at a crystallinity of 0% (i.e., 0.889 g/cm$^3$) and the density of 1,2-polybutadiene at a crystallinity of 100% (i.e., 0.963 g/cm$^3$) were used for the calculation.
[Crystallinity of polyethylene]: The crystallinity of polyethylene was calculated from densities which were measured by the water displacement method. The density of polyethylene at a crystallinity of 0% (i.e., 0.850 g/cm$^3$) and the density of polyethylene at a crystallinity of 100% (i.e., 1.014 g/cm$^3$) were used for the calculation.
[Crystallinity of ethylene-propylene rubber]: The crystallinity (%) of ethylene-propylene rubber was determined by using X-ray diffraction analysis through the following formula (1):

the crystallinity (%)={(the peak area derived from a crystalline moiety)/(the peak area derived from the crystalline moiety+the peak area derived from an amorphous moiety)}×100    (1).

Production Example 1: Preparation of Surface-Modified Silica

Silica (trade name: Hi-Sil EZ160Z, manufactured by PPG Silica Products) (1,000 g) was added to a Henschel mixer, and the temperature in the mixer was adjusted to 100° C. 3-Mercaptopropyltrimethoxysilane (71.43 g) was then added with spraying to the mixer, and the resultant mixture was stirred for 10 minutes. Subsequently, stearic acid (trade name: LUNAC S-30, manufactured by Kao Corporation) (40 g) was added to the mixer, and then the temperature in the mixer was increased to 120° C., followed by further stirring for 30 minutes, to thereby prepare surface-modified silica M.

Production Example 2: Synthesis of Polymer P Having Crystalline Character

A polymerization solution (3.5 L) (butadiene: 30 mass %, cyclohexane: 70 mass %) was added to a stainless steel reaction vessel (inner volume: 5 L) equipped with a stirrer and purged with nitrogen gas. Subsequently, water (5.3 mmol), diethylaluminum chloride (10.5 mmol), carbon disulfide (1.8 mmol), cyclooctadiene (40 mmol), and cobalt octoate (0.04 mmol) were added to the reaction vessel, and the mixture was stirred at 50° C. for 60 minutes, to thereby allow polymerization to proceed. Thereafter, butadiene (200 mL), water (4.5 mmol), triethylaluminum chloride (13.4 mmol), and cobalt octoate (0.02 mmol) were added to the reaction vessel, and the mixture was stirred at 50° C. for 60 minutes, to thereby allow polymerization to proceed. A 1% solution of phenyl-β-naphthylamine in ethanol was added to the resultant mixture, to thereby terminate polymerization. Thereafter, unreacted butadiene and 2-butene were removed through evaporation, and the remaining mixture was dried under vacuum at 105° C. for 60 minutes. The resultant polymer P (syndiotactic 1,2-polybutadiene) was found to have a crystallinity of 5%.

Production Example 3: Synthesis of Polymer Q Having Crystalline Character

A polymerization solution (3.5 L) (butadiene: 30 mass %, cyclohexane: 70 mass %) was added to a stainless steel reaction vessel (inner volume: 5 L) equipped with a stirrer and purged with nitrogen gas. Subsequently, water (5.3 mmol), diethylaluminum chloride (10.5 mmol), carbon disulfide (1.8 mmol), cyclooctadiene (40 mmol), and cobalt octoate (0.04 mmol) were added to the reaction vessel, and the mixture was stirred at 50° C. for 30 minutes, to thereby allow polymerization to proceed. Thereafter, butadiene (560 mL), water (4.5 mmol), triethylaluminum chloride (13.4 mmol), and cobalt octoate (0.04 mmol) were added to the reaction vessel, and the mixture was stirred at 50° C. for 30 minutes, to thereby allow polymerization to proceed. A 1% solution of phenyl-β-naphthylamine in ethanol was added to the resultant mixture, to thereby terminate polymerization. Thereafter, unreacted butadiene and 2-butene were removed through evaporation, and the remaining mixture was dried under vacuum at 105° C. for 60 minutes. The resultant polymer Q (syndiotactic 1,2-polybutadiene) was found to have a crystallinity of 12.5%.

Production Example 4: Synthesis of Modified Conjugated Diene-Based Polymer R Cyclohexane (2,500 g), tetrahydrofuran (50 g), styrene (125 g), and 1,3-butadiene (365 g) were added to an autoclave reactor (inner volume: 5 L) purged with nitrogen. The internal temperature of the reactor was adjusted to 10° C., and then n-butyllithium (5.20 mmol) serving as a polymerization initiator was added to thereby initiate polymerization. The polymerization was performed under adiabatic conditions, and the maximum temperature reached 85° C. After the polymerization conversion had reached 99% (25 minutes after initiation of the polymerization), 1,3-butadiene (10 g) was added over 1 minute, and then 2,2-dimethoxy-1-(3-trimethoxysilylpropyl)-1-aza-2-silacyclopentane (1.65 mmol) was added for allowing reaction to proceed for 15 minutes, to thereby prepare a polymer solution containing a modified conjugated diene-based polymer.

Subsequently, 2,6-di-tert-butyl-p-cresol (4.40 g) was added to the resultant polymer solution, and then silicon tetrachloride (1.88 mmol) was added thereto. Thereafter, the solvent was removed from the resultant mixture by steam stripping, followed by drying by means of a heat roller at 110° C., to thereby produce a hydrogenated conjugated diene-based polymer R.

Production of Rubber Composition and Evaluation of Physical Properties

Comparative Examples 1 to 3 and Examples 1 to 8

In a first mixing step, components (formulation: as shown in Table 1 below) were mixed by means of a plastomill (inner volume: 250 mL) equipped with a temperature controller (charging rate: 71 vol %, rotation speed: 60 rpm) at 100° C. Subsequently, in a second mixing step, the above-mixed product was cooled to room temperature, and then components (formulation: as shown in Table 1 below) were mixed (charging rate: 72 vol %, rotation speed: 60 rpm) at 70° C. The product produced by the second mixing step was molded and vulcanized by means of a vulcanizing press at 160° C. for a specific period of time, to thereby produce crosslinked rubber. The crosslinked rubber was evaluated for the following properties (1) to (4).
(1) Hardness
The hardness (Duro A) was measured according to JIS K6253. The results were indicated by an index relative to that of Comparative Example 1 as 100. A larger value indicates a higher hardness.

(2) Wear Resistance

The wear resistance was determined by means of a DIN wear tester (manufactured by Toyo Seiki) according to JIS K 6264 at a load of 10 N and 25° C. The results were indicated by an index relative to that of Comparative Example 1 as 100. A larger value indicates superior wear resistance.

(3) 50° C. tan δ

The 50° C. tan δ was determined by means of ARES-RDA (manufactured by TA Instruments) at 50° C. (shear strain: 5.0%, angular velocity: 100 radians/second). The results were indicated by an index relative to that of Comparative Example 1 as 100. A larger value indicates a smaller energy loss; i.e., superior low hysteresis loss property.

(4) 0° C. tan δ

The 0° C. tan δ was determined by means of ARES-RDA (manufactured by TA Instruments) at 0° C. (shear strain: 0.1%, angular velocity: 100 radians/second). The results were indicated by an index relative to that of Comparative Example 1 as 100. A larger value indicates superior wet grip property.

by JSR Corporation; crystallinity of "JSR RB810": 18%, crystallinity of "JSR RB840": 36%)

Polyethylene (polymer having crystalline character): trade name "Petrothene 213" and "Nipolonhard 6530" (manufactured by Tosoh Corporation; crystallinity of "Petrothene 213": 46%, crystallinity of "Nipolonhard 6530": 65%)

Ethylene-propylene rubber (polymer having crystalline character): trade name "JSR EP51" (manufactured by JSR Corporation; crystallinity: 10%)

Silica: trade name "Hi-Sil EZ160Z" (manufactured by PPG Silica Products)

Silane coupling agent: trade name "Si75" (manufactured by Evonik)

Oil: trade name "Fukkol Aromax #3" (manufactured by FUJI KOSAN CO., LTD.)

Stearic acid: trade name "LUNAC S-30" (manufactured by Kao Corporation)

Antioxidant: trade name "Ozonone 6C" (manufactured by Seiko Chemical Co., Ltd.)

TABLE 1

| | | Comparative Example 1 | Comparative Example 2 | Comparative Example 3 | Example 1 | Example 2 | Example 3 | Example 4 | Example 5 | Example 6 | Example 7 | Example 8 |
|---|---|---|---|---|---|---|---|---|---|---|---|---|
| Components of first mixing step [phr] | Modified conjugated diene-based polymer R | 70 | 70 | 70 | 70 | 70 | 70 | 70 | 70 | 70 | 70 | 70 |
| | Polybutadiene rubber (JSR BR01) | 30 | 30 | 20 | 20 | 20 | 20 | 20 | 20 | 20 | 20 | 10 |
| | Polymer having crystalline character P | | | | 10 | | | | | | | |
| | Polymer having crystalline character Q | | | | | 10 | | | | | | |
| | 1,2-Polybutadiene (JSR RB810) | | | 10 | | | 10 | | | | | 20 |
| | 1,2-Polybutadiene (JSR RB840) | | | | | | | 10 | | | | |
| | Polyethylene (Petrothene 213) | | | | | | | | 10 | | | |
| | Polyethylene (Nipolonhard 6530) | | | | | | | | | 10 | | |
| | Ethylene-propylene rubber (JSR EP51) | | | | | | | | | | 10 | |
| | Silica | 70 | | 70 | | | | | | | | |
| | Surface-modified silica M | | 75 | | 75 | 75 | 75 | 75 | 75 | 75 | 75 | 75 |
| | Silane coupling agent | 5.0 | | 5.0 | | | | | | | | |
| | Oil | 22 | 22 | 22 | 22 | 22 | 22 | 22 | 22 | 22 | 22 | 22 |
| | Stearic acid | 2 | 2 | 2 | 2 | 2 | 2 | 2 | 2 | 2 | 2 | 2 |
| | Zinc oxide | 3 | 3 | 3 | 3 | 3 | 3 | 3 | 3 | 3 | 3 | 3 |
| | Antioxidant | 1 | 1 | 1 | 1 | 1 | 1 | 1 | 1 | 1 | 1 | 1 |
| | Subtotal | 203 | 203 | 203 | 203 | 203 | 203 | 203 | 203 | 203 | 203 | 203 |
| Components of second mixing step [phr] | Vulcanization accelerator D | 1.5 | 1.5 | 1.5 | 1.5 | 1.5 | 1.5 | 1.5 | 1.5 | 1.5 | 1.5 | 1.5 |
| | Vulcanization accelerator CZ | 1.8 | 1.8 | 1.8 | 1.8 | 1.8 | 1.8 | 1.8 | 1.8 | 1.8 | 1.8 | 1.8 |
| | Sulfur | 1.5 | 1.5 | 1.5 | 1.5 | 1.5 | 1.5 | 1.5 | 1.5 | 1.5 | 1.5 | 1.5 |
| | Total | 207.8 | 207.8 | 207.8 | 207.8 | 207.8 | 207.8 | 207.8 | 207.8 | 207.8 | 207.8 | 207.8 |
| Evaluation of physical properties | Hardness | 100 | 94 | 103 | 98 | 99 | 100 | 101 | 102 | 103 | 98 | 102 |
| | DIN wear | 100 | 140 | 102 | 130 | 132 | 130 | 128 | 131 | 134 | 140 | 101 |
| | 50° C. tan δ | 100 | 124 | 95 | 122 | 120 | 118 | 125 | 124 | 122 | 117 | 110 |
| | 0° C. tan δ | 100 | 144 | 127 | 142 | 147 | 151 | 130 | 145 | 144 | 140 | 148 |

Details of the components used (see Table 1) are as follows.

Polybutadiene rubber: trade name "JSR BR01" (manufactured by JSR Corporation)

1,2-Polybutadiene (polymer having crystalline character): trade name "JSR RB810" and "JSR RB840" (manufactured Zinc oxide: trade name "Zinc Oxide type 2" (manufactured by SEIDO CHEMICAL INDUSTRY CO., LTD.)

Vulcanization accelerator D: trade name "Nocceler D" (manufactured by OUCHI SHINKO CHEMICAL INDUSTRIAL CO., LTD.)

Vulcanization accelerator CZ: trade name "Nocceler CZ" (manufactured by OUCHI SHINKO CHEMICAL INDUSTRIAL CO., LTD.)

Sulfur: trade name "GOLDEN FLOWER SULFUR POWDER 200 Mesh" (manufactured by Tsurumi Chemical Industry Co., Ltd.)

According to the results shown in Table 1, each of the rubber compositions of Examples 1 to 8 was found to produce crosslinked rubber exhibiting well-balanced improvement in wear resistance, low hysteresis loss property, and wet grip property and having sufficiently high hardness, as compared with the rubber composition of Comparative Example 1 (wherein unmodified silica was incorporated without incorporation of a polymer having crystalline character). Meanwhile, the rubber composition of Comparative Example 2 (wherein surface-modified silica and a modified conjugated diene-based polymer were incorporated without incorporation of a polymer having crystalline character) was found to produce crosslinked rubber having hardness considerably lower than that of crosslinked rubber produced from each of the rubber compositions of Examples 1 to 8. The rubber composition of Comparative Example 3 (a modified conjugated diene-based polymer and a polymer having crystalline character were incorporated without incorporation of surface-modified silica) was found to produce crosslinked rubber having low hysteresis loss property considerably inferior to that of crosslinked rubber produced from each of the rubber compositions of Examples 1 to 8.

What is claimed is:

1. A rubber composition, comprising:
   (A) a modified conjugated diene-based polymer;
   (B) modified silica; and
   (C) a polymer having crystalline character and a melting point of 50° C. or higher,
   wherein the polymer having crystalline character (C) comprises a polyethylene, polypropylene, ethylene-propylene copolymer, polystyrene, ethylene-1-butene copolymer, and/or ethylene-propylene-1-butene copolymer.

2. A composition of claim 1, wherein the polymer having crystalline character (C) has a crystallinity in a range of from 5 to 70%.

3. The composition of claim 1, wherein the polymer having crystalline character (C) is present in a range of from 1 to 15 mass %, relative to an entire rubber composition mass.

4. The composition of claim 1, wherein the polymer having crystalline character (C) comprises 1,2-polybutadiene and at least one selected from the group consisting of the polystyrene, the polypropylene, the polyethylene, and the ethylene-propylene copolymer.

5. The composition of claim 1, wherein the polymer having crystalline character (C) further comprises syndiotactic 1,2-polybutadiene.

6. The composition of claim 1, wherein the modified silica (B) has at least one group selected from the group consisting of an amino group, an amido group, a carboxy group, a carbinol ester group, a mercapto group, and a (poly)sulfide group.

7. The composition of claim 1, wherein the modified conjugated diene-based polymer (A) is a product obtained through reaction between a conjugated diene-based polymer having an active terminal and a compound comprising a functional group capable of reacting with the active terminal and a functional group that interacts with silica.

8. A crosslinked product, obtained through crosslinking of the rubber composition of claim 1.

9. A tire, comprising:
   a tread; and
   a sidewall,
   wherein at least one of the tread and the sidewall is formed of the crosslinked product of claim 8.

10. The tire, comprising the composition of claim 1.

11. The composition of claim 1, wherein the modified silica (B) comprises an amino group, an amido group, a carboxy group, a carbinol ester group, a mercapto group, and/or a (poly)sulfide group.

12. The composition of claim 1, wherein the polymer having crystalline character (C) has a melting point in a range of from 65 to 140° C.

13. The composition of claim 1, wherein the polymer having crystalline character (C) has a crystallinity in a range of from 5 to 18%.

14. The composition of claim 1, wherein the polymer having crystalline character (C) further comprises a 1,2-polybutadiene having a crystallinity in a range of from 5 to 70%.

15. The composition of claim 1, wherein the polymer having crystalline character (C) comprises the ethylene-propylene copolymer, polystyrene, ethylene-1-butene copolymer, and/or ethylene-propylene-1-butene copolymer.

16. The composition of claim 1, comprising no more than 79 phr of inorganic fillers.

17. The composition of claim 1, wherein the modified conjugated diene-based polymer (A) is present in a range of from 20 to 95 mass %, relative to an entire rubber composition mass.

18. The composition of claim 1, wherein the modified conjugated diene-based polymer (A) is present in a range of from 30 to 90 mass %, relative to an entire rubber composition mass.

19. The composition of claim 1, wherein the modified conjugated diene-based polymer (A) is present in a range of from 40 to 80 mass %, relative to an entire rubber composition mass.

20. The composition of claim 1, wherein the modified conjugated diene-based polymer (A) is present in at least 70 phr.

* * * * *